United States Patent
Muhlhoff et al.

(10) Patent No.: US 8,672,008 B2
(45) Date of Patent: Mar. 18, 2014

(54) HIGH-CONTRAST TIRE PATTERN AND METHOD FOR PRODUCING SAME

(75) Inventors: Olivier Muhlhoff, Chateaugay (FR); Jean-Claude Desvignes, Gerzat (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/496,917

(22) PCT Filed: Sep. 9, 2010

(86) PCT No.: PCT/EP2010/063212
§ 371 (c)(1),
(2), (4) Date: May 31, 2012

(87) PCT Pub. No.: WO2011/036061
PCT Pub. Date: Mar. 31, 2011

(65) Prior Publication Data
US 2012/0227879 A1    Sep. 13, 2012

(30) Foreign Application Priority Data
Sep. 28, 2009   (FR) .................................... 09 56675

(51) Int. Cl.
*B60C 13/00*   (2006.01)
*B60C 13/02*   (2006.01)

(52) U.S. Cl.
USPC .......................................................... 152/523

(58) Field of Classification Search
CPC .................... B60C 13/00; B60C 13/02–13/04
USPC .................................................. 152/523–525
IPC ........................................................ B60C 13/00
See application file for complete search history.

(56) References Cited

U.S. PATENT DOCUMENTS

2005/0087521 A1    4/2005   Yang
2009/0218019 A1*   9/2009   Paturle .................... 152/209.18

FOREIGN PATENT DOCUMENTS

| EP | 1 063 071 A2 | 12/2000 | |
| EP | 1063071 A2 * | 12/2000 | ............. B60C 13/00 |
| WO | WO 2007/045425 A1 | 4/2007 | |

OTHER PUBLICATIONS

Machine translation of EP1063071A2; Pfaff, Daniel; no date.*
International Search Report (PCT/ISA/210) issued on Oct. 8, 2010, by European Patent Office as the International Searching Authority for International Application No. PCT/EP2010/063212.
French Search Report for FR 0956675 dated Mar. 8, 2010.
French Search Report for FR1050121 dated Mar. 30, 2010.

* cited by examiner

*Primary Examiner* — Justin Fischer
*Assistant Examiner* — Kendra Shin
(74) *Attorney, Agent, or Firm* — Dickinson Wright PLLC

(57) ABSTRACT

Tire having a visible surface comprising patterns contrasting with said surface, said pattern comprising, over the entire surface thereof, a plurality of tufts distributed with a density of at least five tufts per $mm^2$ or a plurality of blades which are substantially parallel to one another and arranged with a pitch of less than 0.5 mm, each tuft having a mean cross section having a diameter of between 0.03 mm and 0.5 mm or each blade having a mean width of between 0.03 mm and 0.5 mm, characterized in that the walls of the tufts or of the blades have, over at least one quarter of the area thereof, a mean roughness Rz of between 5 μm and 30 μm.

8 Claims, 5 Drawing Sheets

HIGH-CONTRAST TIRE PATTERN AND METHOD FOR PRODUCING SAME

The invention relates to the technical field of vehicle tires, having highly contrasting markings, and to a method for producing molds intended for molding and vulcanising said tires.

More particularly, the invention is an improvement to the publication WO 2007/045425 that describes particular types of highly contrasting markings.

The surface of the tires includes a large number of markings intended, on the one hand, to provide legal technical information about the quality of the tire and, on the other hand, to allow the user to distinguish the brand and the origin of the product.

As a general rule, these markings are obtained by raised patterns provided on the surface of the tire and correspond to sunken features produced on the molding surface. Usually, the vulcanising molds are made of a metal having a very good appearance in terms of surface finish. However, the external surface of the smooth black tire that results therefrom has the effect of scattering light.

The contrast effect described in the abovementioned publication is obtained by providing a plurality of tufts distributed over the entirety of a pattern, each tuft having a mean cross section having a diameter of between 0.03 mm and 0.5 mm, the height of which tufts is at least equal to 0.1 mm, and distributed over the surface of the pattern with a density of at least 5 tufts per $mm^2$ and preferably more than 15 tufts per $mm^2$.

It should be noted that the same contrast effect is obtained when, instead of tufts, the entire surface of the pattern is provided with parallel blades having a mean width of between 0.03 mm and 0.5 mm, the height of which blades is at least equal to 0.1 mm, these being arranged with a pitch of at most 0.5 mm.

The effect of these tufts or blades is to trap the incident light on the surface of the pattern and, by light absorption, to give a black matt appearance to the pattern intended to be produced.

The object of the present invention is to provide a particular surface finish of the above tufts or blades, making it possible to improve the contrast effect of the patterns comprising these tufts or blades, and a method making it possible to produce the molds intended to form the visible imprint of the tires comprising such patterns during the vulcanisation step.

The invention therefore relates to a tire having a visible surface comprising patterns contrasting with said surface, said pattern comprising, over the entire surface thereof, a plurality of tufts distributed with a density of at least five tufts per $mm^2$ or a plurality of blades which are parallel to one another and arranged with a pitch of less than 0.5 mm, each tuft having a mean cross section having a diameter (d) of between 0.03 mm and 0.5 mm or each blade having a mean width (d) of between 0.03 mm and 0.5 mm.

According to the invention, the tufts or blades should have, over at least one quarter of their surface, a mean roughness Rz of between 5 μm and 30 μm.

This is because it has been demonstrated that the incident light is as it were trapped by multiple reflections on the surface of the tufts or blades when said surface has asperities capable, because of the multitude of angles of incidence that they offer compared with the average surface, of reflecting the light in random directions. These results in a more matt visual impression and, in the case of patterns produced on tires, a more intense black color forming a better contrast with the rest of the surface of the tire.

The contrast is even greater when the surface of the pattern borders shiny surfaces.

The contrast effect starts to be appreciable compared with tufts having a less rough surface, when at least one quarter of the surface of the tuft or blade has this roughness.

Likewise, as will be seen later, it is possible to vary the intensity of the contrast by increasing the proportion of the surface having this minimum roughness or by positioning the rougher surface towards the tip or towards the foot of the tuft or blade.

The invention also relates to a method for producing a metal mold intended for molding and vulcanising a tire according to the invention and comprising patterns forming a greater contrast with the surface.

According to this method, patterns are produced using a laser that generates a light beam of sufficient energy to sublime the constituent metal of the mold, said patterns comprising, over the entire surface thereof, cavities having a mean cross section having a diameter (d) of between 0.03 mm and 0.5 mm with a density of at least five cavities per $mm^2$, or grooves that are parallel to one another and have a given mean width (d) of between 0.03 mm and 0.5 mm and are separated by a pitch of less than 0.5 mm, said cavities or grooves having a depth of at least 0.1 mm, by applying the light beam emanating from the laser source over the surface of the mold in one or more successive passes, each of the passes having the effect of eroding the metal over a given area and a given depth. This method is characterized in that, during a pass, the melting and sublimation of the metal by the light beam has the effect of spraying liquid metal and of condensing metal vapour on the walls of the cavity obtained during the preceding passes.

The almost instantaneous rise in temperature of the metal by the energy provided by the laser source causes melting but also sublimation of the metal in the form of a violent outgassing, which has the effect of spattering nodules of material onto the walls of the cavity or groove that were produced during the preceding passes. Upon solidifying, these nodules create surface irregularities, the characteristics of which correspond precisely to the desired roughness for molding the tufts or blades forming the subject of the invention.

The gases coming from the sublimation of the metal condense on the walls of the cavity and increase the irregularities.

It is therefore important for the melting and sublimation of the metal to take place in a very short time so as to generate this "explosive" phenomenon.

Moreover, successive passes should be carried out so as to allow the spattered liquid and vapour to solidify or re-condense between each pass on said walls, which are colder.

Preferably, the passes are ordered in such a way that the cross section of the surface eroded during one pass is greater than the cross section eroded during the preceding pass.

As a variant, the passes are ordered in such a way that the cross section of the surface eroded during one pass is smaller than the cross section eroded during the preceding pass.

As a variant, some of the passes are ordered in such a way that the cross section of the surface eroded during one pass is greater than the cross section eroded during the preceding pass and other passes are ordered in such a way that the cross section of the surface eroded during one pass is smaller than the cross section eroded during the preceding pass.

Preferably, the metal vapour generated by applying the light beam to the metal surface is sucked away in a suitable suction means.

The following description is supported by FIGS. 1 to 9 in which.

Figure 1:
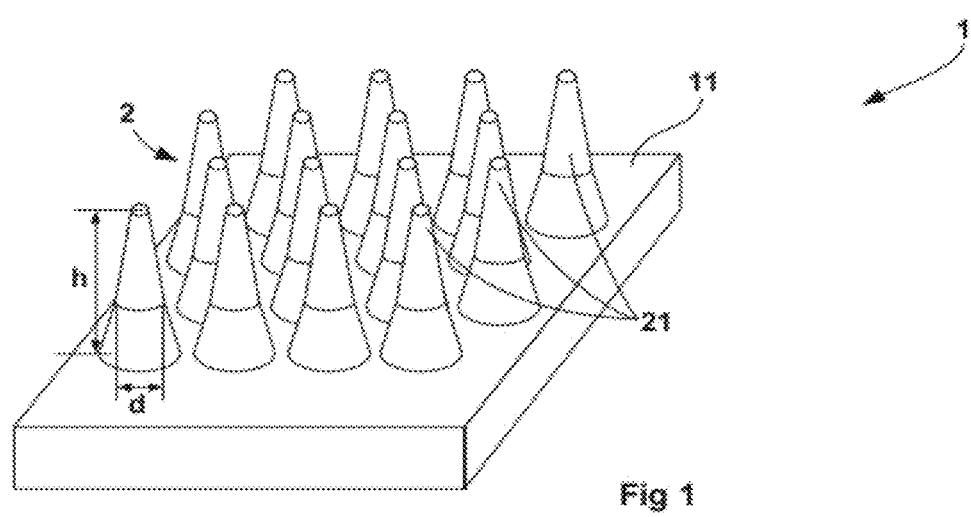
FIG. 1 shows a schematic view of the surface of a pattern comprising tufts.

FIG. 1 shows a tire portion 1, the visible surface 11 of which has a pattern 2. This pattern consists of a multiplicity of tufts 21 having a height h, the mean cross section of which has a diameter d. To obtain a perceptible contrast effect, as explained in the publication WO 2006/009980, the diameter d of the mean cross section of a tuft must be between 0.03 mm and 0.5 mm and the tuft density must be greater than five tufts per mm$^2$ and preferably greater than fifteen tufts per mm$^2$.

Preferably, the height h is greater than 0.1 mm. The height of a tuft is measured between the foot of the tuft, in contact with the surface 11 of the tire and the tip of the tuft. However, it should be noted that, when the ratio h/d between the height of the tuft and the diameter of the mean cross section is too low, the upper portion of the tufts tends to curve over, this having the consequence of reducing the desired contrast effect. An h/d ratio of between 1.2 and 6 and preferably between 2 and 4, will therefore be chosen.

Since the overall shape of the tufts is conical, the cross section of said tufts decreases when going from the foot towards the tip. The expression "mean cross section" is therefore understood as the mean of the cross sections measured at regular intervals from the foot to the tip of the tuft.

Figure 2:
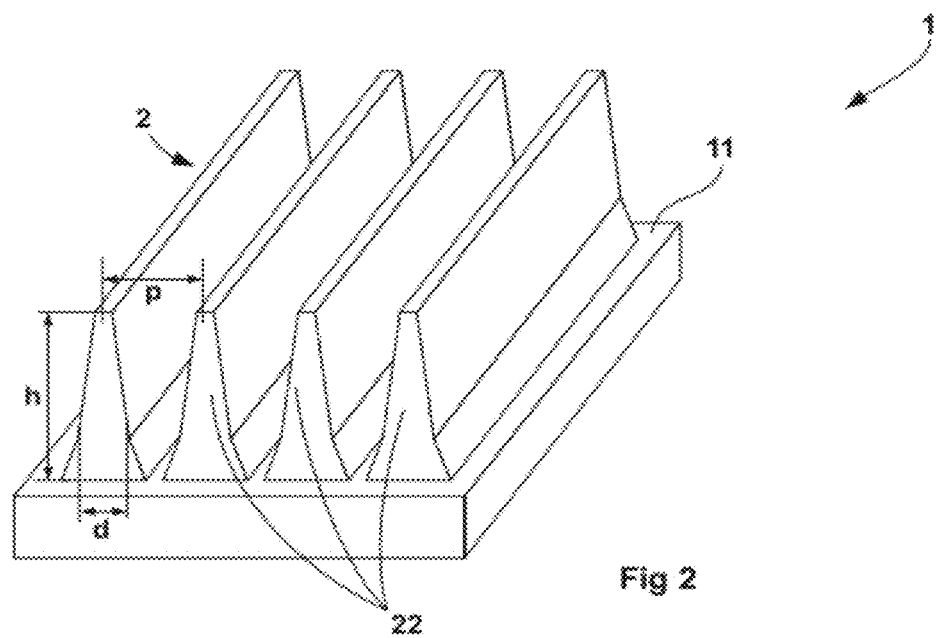
FIG. 2 shows a schematic view of the surface of a pattern comprising blades.

The pattern 2 shown in FIG. 2 comprises a plurality of blades 22 of height h and mean width d. Similarly to what was explained above, the desired contrast effects are obtained with corresponding dimensions, namely a mean width d of at least 0.1 mm and a density, described here by a pitch p, which must be less than 0.5 mm and preferably less than 0.2 mm.

For the same reasons as in the case of the tufts, the h/d ratio is arranged to be between 1.2 and 6 and preferably between 2 and 4.

According to the invention, at least one quarter of the external surface of the tuft or blade, namely the surface lying between the foot and the tip of the tuft 21 or blade 22, should have a surface finish defined by a mean roughness Rz of between 5 μm and 30 μm.

Figure 3:
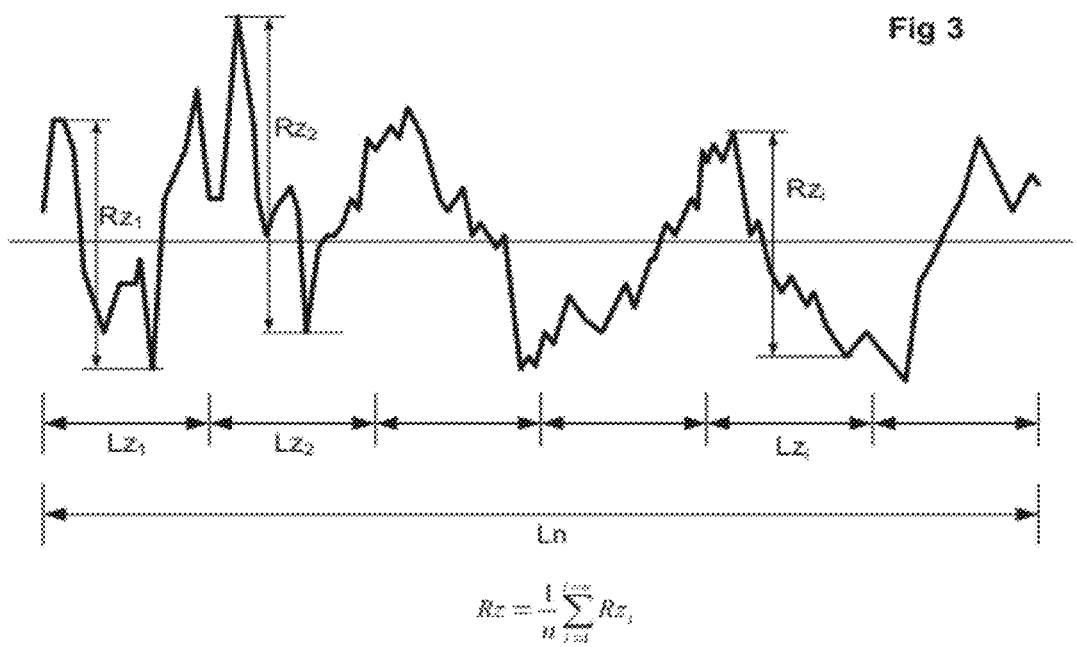
FIG. 3 illustrates the way in which the mean roughness of a surface is calculated.

To calculate the mean roughness Rz of a surface, a given length of the surface to be evaluated, called the evaluation length Ln, is cut up into n base lengths Lz of identical length, as illustrated in FIG. 3. An individual profile height $Rz_i$ is determined on each of the base lengths, this height being the sum of the greatest of the projection heights and the greatest depth of the indentations of the profile of the surface within the base length $Lz_i$. The mean height Rz is the arithmetic mean of the individual values $Rz_i$ over all the base lengths in question (DIN 4768 (1990) Standard) and is expressed by the following formula:

$$Rz = \frac{1}{n}\sum_{i=1}^{i=n} Rz_i$$

The 5 μm and 30 μm limits are experimentally determined limits, the lower value being the value below which it is considered that the surface of the tuft or blade becomes "smooth" and thus will reflect the incident light, which is therefore no longer trapped in the network formed by the tufts.

The upper limit is given by way of indication and corresponds, considering the dimensions of the tuft, to the acceptable limit for preventing the tufts from being torn off during the molding. This upper value, which corresponds to a maximum effectiveness of the light-trapping phenomenon, may be favourably obtained when the mean cross section of the tufts or the width of the blades is increased, noting that the increase in this value has the effect of reducing the density of the tufts per unit area, and therefore reducing the contrast effect.

Figure 4:
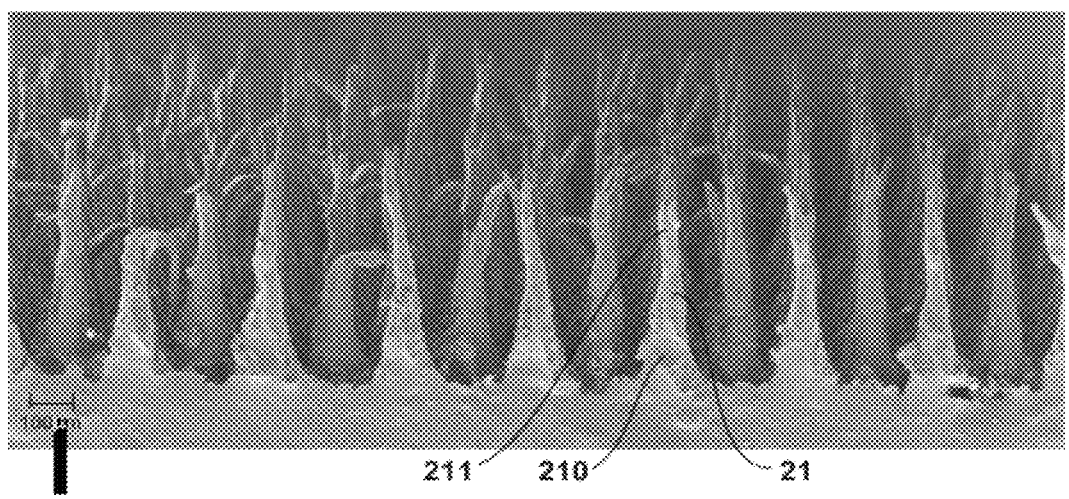
FIG. 4 shows an electron micrograph of a pattern comprising tufts.

FIG. 4 is an electron micrograph of the surface of a tire having a pattern comprising tufts 21. It may be seen that the foot of the tuft 210 has high roughness, whereas the upper portion 211 is smoother.

It should also be noted in this micrograph that there are tufts having curved-over tips because of an h/d ratio close to the recommended upper limit.

Patterns comprising a plurality of tufts are obtained by molding, by providing for this purpose a curing mold on which the patterns intended to increase contrast appear.

The method according to the invention uses a laser light source, the power of which is sufficient to liquefy and sublime the constituent metal of the mold. To give an example, a laser of IPG brand with a power of 50 W, of the etching laser type, with pulses, successfully gave the experimental results presented in FIGS. 4, 5 and 6 of the present description. The frequency of the pulses, of the order of 100 kHz, and the power were able to be adapted so as to vary the amount of energy transmitted to the surface of the mold at each pulse.

As mentioned above, the light beam emanating from the laser source is applied to the surface of the mold in successive passes, each of the passes having the effect of eroding the metal over an area and a given depth.

During one pass, a quantity of thermal energy per unit area is imparted to the metal in a sufficiently short time so that the melting and sublimation of the metal by the light beam has the effect of spattering liquid metal and of condensing the metal vapour on the walls of the cavity obtained during the preceding passes.

To do this, the width of the light beam and the scan speed are varied.

Thus, for a 50 Watt laser, the width of the light beam is around 70 μm. However, it will be noted that more than 70% of the energy is concentrated in the central portion of the beam and that this value may be optimized, according to the adjustment of the return optics used to guide the laser beam onto the chosen point of impact on the surface of the mold. As a result, the useful area of the light beam is substantially between 0.001 mm$^2$ and 0.01 mm$^2$.

The frequency of the impacts is 100 kHz, i.e. one pulse every 10 μs. The duration of the pulse itself may be even shorter, depending on the type of pulsed laser, such as the lasers commonly used in the laser etching or cutting industry.

The increase in depth of the cavity obtained after each pass, corresponding to the amount of metal removed, is relatively small and remains between 0.1 mm and 0.20 mm, since the removal of material essentially takes place by evacuating the vapour produced.

It is therefore necessary to provide a vapour suction means so as to avoid polluting the working environment.

However, the power of the suction should not be set to the maximum possible for this kind of installation, so as not to extract by force ventilation all of the vapour produced, which would have the effect of reducing the magnitude of the desired phenomenon of the metal vapour re-condensing on the walls of the cavity. Although they do not comply with the health and safety standards imposed in industrial environments, trials carried out with no local force ventilation placed in the immediate proximity of the point of impact have nevertheless given satisfactory results.

Figure 5:
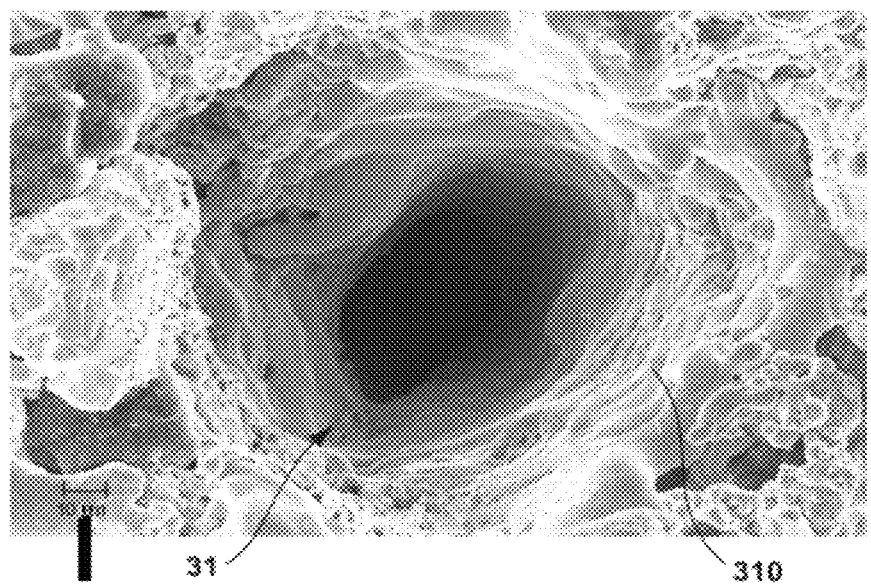
FIG. 5 shows an electron micrograph of the upper portion of a cavity produced using a method according to the invention.
Figure 6:
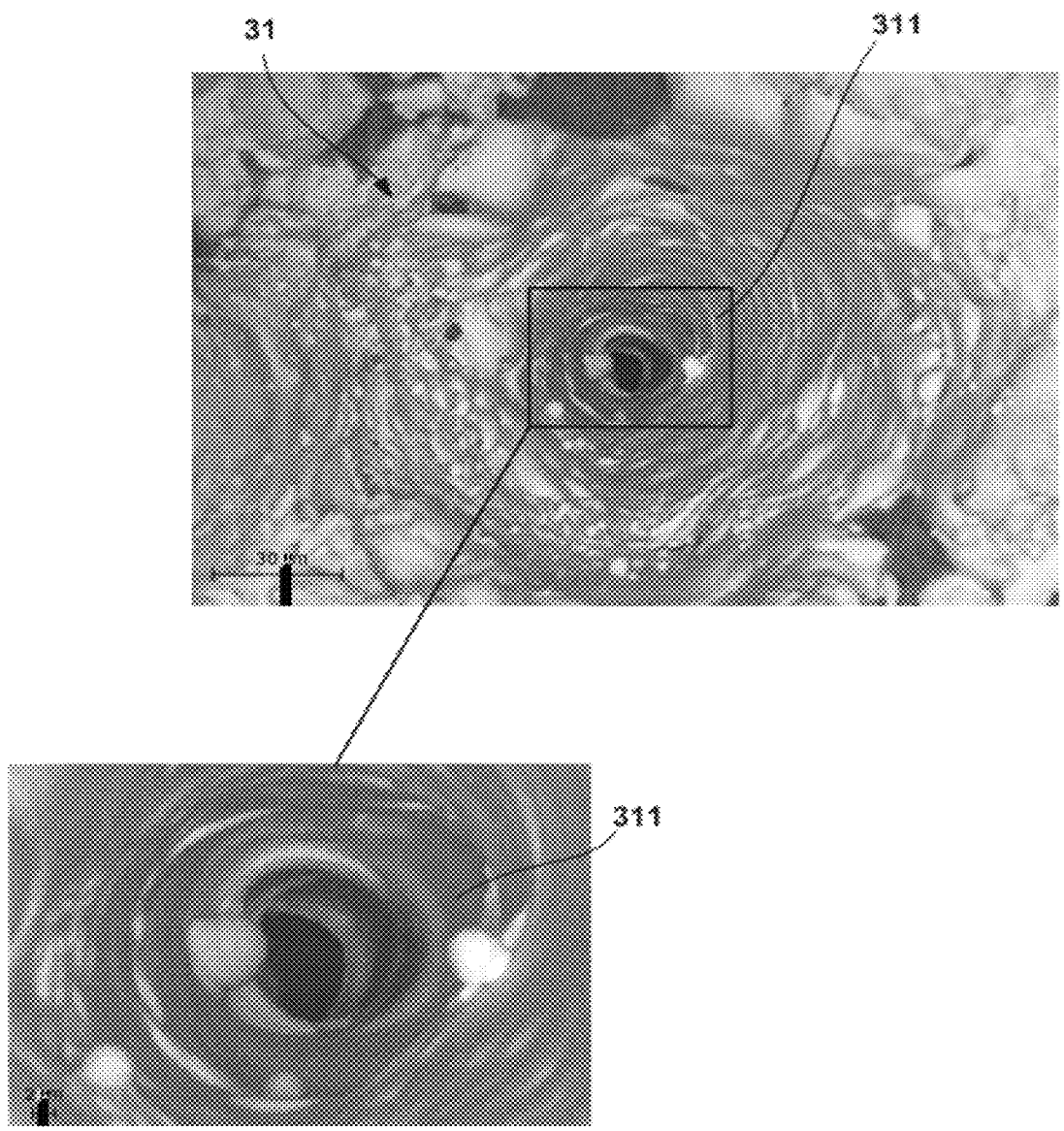
FIG. 6 shows an electron micrograph of the lower portion of a cavity produced using a method according to the invention.

FIGS. 5 and 6 are electron micrographs of a cavity 3 intended for molding a tuft 21. It may be seen in FIG. 5 that the wall 310 of the cavity located close to the emerging part of said cavity (intended for molding the foot 210 of the tuft 21) has a high roughness. FIG. 6 and the magnified inset show a view of the bottom 320 of the cavity 3 intended for molding the tip 220 of the tuft. In this region, the surface of the cavity wall is much smoother. This is explained by the fact that those portions of the cavity produced last are less exposed to the spattering of nodules and the condensation of the vapour produced during the successive preceding passes and therefore do not have the required roughness.

Figure 7:
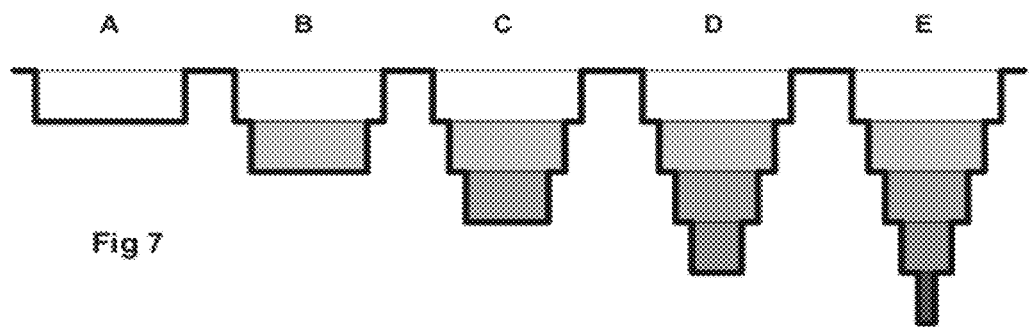
FIGS. 7, 8 and 9 show schematic illustrations of the way in which the passes are ordered one with respect to another in order to obtain relatively intense contrast effects.
Figure 8:
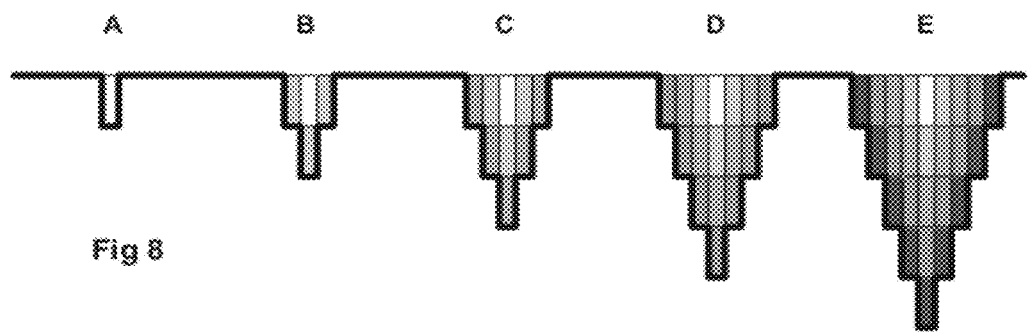
Figure 9:
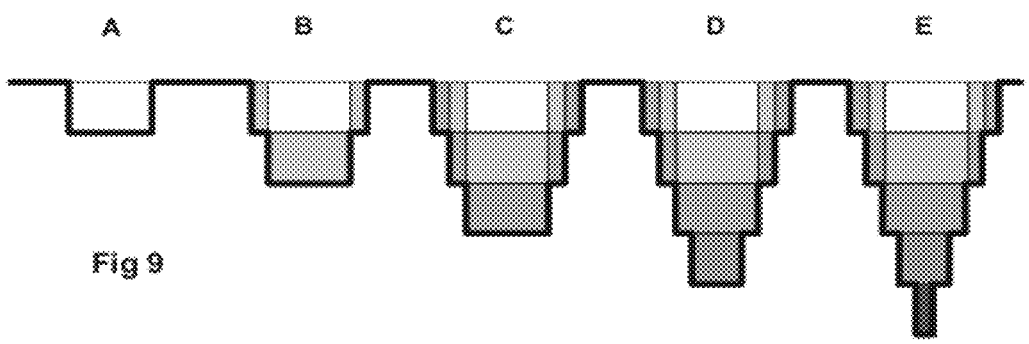

It is therefore possible to benefit from this phenomenon in order to vary the distribution of the zones having the desired roughness on the surface of the tuft or of the blade by varying the cross section of the surface eroded at each pass, as illustrated schematically in FIGS. 7, 8 and 9.

FIG. 7 illustrates the case in which, over the course of the first pass (A), the surface of the pattern is eroded over its largest cross section, corresponding substantially to the cross section of the foot of the tuft, this being represented by a cut-out (in white). During the next pass (B), the cavity is hollowed out over a smaller cross section (in light grey), and so on, considering that the final pass (E) takes place over the smallest cross section corresponding substantially to that portion of the cavity intended to mold the tip of the tuft.

FIG. 8 corresponds to the reverse case in which the first pass (A) takes place over the smallest cross section, the second pass (B) relates to a greater cross section so that, at each pass, the cross section of the cavity increases over the entire depth thereof.

FIG. 9 shows the situation in which the two above operating modes are combined, starting with a first pass (A) of moderate cross section. The second pass (B) and the third pass (C) take place with the cross section of the preceding passes being enlarged, and the last two passes (D and E) take place with the material being removed over successively smaller cross sections.

The effect of these different operating modes is, on the one hand, to vary the preferential zones having surfaces with a roughness lying within the desired values and, on the other hand, to vary the magnitude of said roughness.

In the case illustrated in FIG. 7, significant roughness is obtained in the foot region. Preferably, it has been found that this configuration corresponds to maximum trapping of the light and therefore to the maximum blackness. Preferably, arrangements are also made to ensure that the surface of the lower quarter of the height of the tuft has the desired roughness.

In the case illustrated in FIG. 8, a moderate or even low roughness distributed over the entire surface of the tuft is obtained. Finally, in the case illustrated in FIG. 9, a roughness distributed over the entire surface of the tuft, but more pronounced on the foot side, is obtained.

This operating mode applies, mutatis mutandis and with the same effects, for producing the blades.

Although the multiple-pass method seems preferable for obtaining the desired effects, it is not unreasonable to think, in view of the increase in power of lasers obtainable for industrially reasonable costs, and in view of the increase in concentration of the light beams due to advances in industrial optics, that it may be possible in the near future to produce the cavities in a single pass of the laser beam. The teachings of the present description would then apply in the same way.

Finally, and to conclude, it has been demonstrated that the presence of a high roughness at the foot of the tuft or blade has a favourable effect for removing the occluded air in the cavity when molding the tufts.

The invention claimed is:

1. A tire having a visible surface comprising over a portion of the surface patterns contrasting with the rest of said surface, wherein the pattern comprises either:
   a plurality of tufts distributed over the entire portion of the surface comprising the pattern, having a density of at least five tufts per mm$^2$, each tuft having a mean cross section having a diameter of between 0.03 mm and 0.5 mm, or
   a plurality of blades distributed over the entire portion of the surface comprising the pattern, which are substantially parallel to one another and arranged to have a pitch of less than 0.5 mm, each blade having a mean width of between 0.03 mm and 0.5 mm,
   wherein the walls of the tufts or of the blades have, over at least one quarter of the area thereof, a mean roughness Rz of between 5 μm and 30 μm, wherein Rz is equal to:

$$\frac{1}{n}\sum_{i=1}^{i=n} Rzi$$

where $Rzi$ is an individual profile height equal to the sum of the greatest projection height and the greatest depth of indentation of a profile of a surface within a respective base length $Lzi$, formed by dividing an evaluation length $Ln$ into $n$ base lengths $Lz$ of equal length.

2. The tire according to claim 1, wherein the wall of the tuft having said roughness is located in the lower quarter of the height of the tuft.

3. The tire according to claim 1, wherein said tufts or said blades have a mean height of at least 0.1 mm.

4. The tire according to claim 1, wherein said tufts or said blades have a cross section that decreases from the base of the tuft or blade towards the end of the tuft or blade.

5. The tire according to claim 1, wherein the ratio of the height of the tuft or blade to the diameter of a mean cross section of the tuft or to the mean width of the blade is between 1.2 and 6.

6. The tire according to claim 1, wherein the ratio of the height of the tuft or blade to the diameter of a mean cross section of the tuft or to the mean width of the blade is between 2 and 4.

7. The tire according to claim 1, wherein a plurality of tufts is present and wherein the density of the tufts is less than 15 tufts per mm$^2$.

8. The tire according to claim 1, wherein a plurality of blades is present and wherein the pitch of the blades is less than 0.2 mm.

\* \* \* \* \*